United States Patent [19]

Mitchell et al.

[11] Patent Number: 5,164,461

[45] Date of Patent: Nov. 17, 1992

[54] ADDITION-CURABLE SILICONE ADHESIVE COMPOSITIONS

[75] Inventors: Tyrone D. Mitchell, Corning; Mark W. Davis, Clifton Park; Stuart R. Kerr, III, Troy, all of N.Y.

[73] Assignee: General Electric Company, Waterford, N.Y.

[21] Appl. No.: 669,266

[22] Filed: Mar. 14, 1991

[51] Int. Cl.$^5$ ............................................. C08F 283/00
[52] U.S. Cl. ..................................... 525/478; 525/479; 528/15; 528/31; 528/32; 528/33
[58] Field of Search ..................... 528/15, 31, 32, 34; 525/478, 479

[56] References Cited

U.S. PATENT DOCUMENTS

| | | | |
|---|---|---|---|
| 3,759,968 | 9/1973 | Berger et al. | 260/448.2 Q |
| 3,941,741 | 3/1976 | De Zuba et al. | 260/37 SB |
| 4,273,698 | 6/1981 | Smith, Jr. et al. | 260/37 SB |
| 4,293,671 | 10/1981 | Sasaki et al. | 525/478 |
| 4,308,372 | 12/1981 | Smith, Jr. et al. | 528/34 |
| 4,395,507 | 7/1983 | Dziark et al | 524/101 |
| 4,546,164 | 10/1985 | Shen et al. | 525/478 |
| 4,753,978 | 6/1988 | Jensen | 525/478 |
| 4,764,560 | 8/1988 | Mitchell | 524/506 |
| 4,891,407 | 1/1990 | Mitchell | 524/104 |

*Primary Examiner*—John C. Bleutge
*Assistant Examiner*—Margaret W. Glass

[57] ABSTRACT

A fast curing, addition-curable silicone composition curable to form an adhesive having good physical properties and improved lap shear adhesive properties, comprising (A) a vinyl-containing polydiorganosiloxane composition, (B) a hydrogen-terminated polysiloxane in an amount sufficient to provide an adhesion-promoting molar ratio of silicon-bonded hydrogen atoms in (B) to olefinically unsaturated radicals in (A); (C) a catalytic amount of a platinum-containing hydrosilation catalyst; (D) an effective amount of an adhesion promoter selected from the group consisting of (i) bis[3-(trimethoxysilyl)alkyl]fumarates; (ii) bis[3-(trimethoxysilyl)alkyl]maleates; (iii) allyl-[3-(trimethoxysilyl)alkyl]maleates; (iv) allyl-[3-(trimethoxysilyl)alkyl]fumarates; and (v) N-[3-(trimethoxysilyl)alkyl]maleimides, wherein $R^2$, $R^3$, and $R^4$ are each alkyl radicals of 1 to about 8 carbon atoms; and (E) from about 0 to about 200 parts of an extending filler; and (F) from about 0 to about 50 parts of a reinforcing filler; providing that (F) must be present if (A)(ii) is absent.

29 Claims, No Drawings

ADDITION-CURABLE SILICONE ADHESIVE COMPOSITIONS

BACKGROUND OF THE INVENTION

This invention relates to addition-curable silicone compositions. More particularly, this invention relates to addition-curable silicone compositions which are self-bonding to various substrates, such as plastics, metals, and glass.

Addition-curable silicone compositions may be applied to various substrates for various purposes. For example, such compositions may be applied to various synthetic fiber substrates to impart enhanced physical properties to the resulting laminate so that the laminate can be used for such purposes as gaskets, radiator hoses and the like. Further, for various hard substrates, such as metals and glass, so as to impart improved weatherability to the resulting laminated product.

Sometimes, it is necessary to apply addition-curable silicone compositions to heat sensitive substrates, e.g., polyolefins. Coating compositions which require a high temperature in order to cure are generally not compatible with heat sensitive substrates. Therefore, it would be further desirable to provide an addition-curable silicone composition which will cure at lower temperatures in a reasonable period of time, e.g. about 2-3 hours.

Presently, when an addition curable silicone composition is applied to various substrates, it is often necessary to use a primer, that is, a primer is applied on the surface of the substrate and then the silicone rubber composition is applied thereover and cured onto the substrate. In many cases, if a silicone rubber composition is applied to a substrate without a primer, the bond between the silicone rubber and the substrate is not as strong as would be desired. In discussing bonds, it is necessary to distinguish between two types of failure that may occur in the bonding between a silicone rubber layer and a substrate, that is, cohesive failure and adhesive failure. Insofar as it relates to this application, adhesive failure occurs when the silicone rubber layer separates from the substrate at the point wherein the two layers meet, that is, the bond between the silicone rubber layer and the substrate ruptures before the silicone rubber layer or the substrate. Cohesive failure occurs when the silicone rubber layer or the substrate rupture before the bond between the silicone rubber layer and the substrate fails.

The use of a primer entails an additional step in the preparation of the laminate and thus is costly as well as time consuming. Therefore, it would be desirable to provide an addition-curable silicone composition which does not require a primer to be applied to the surface of the substrate and then the silicone composition applied over the primer.

The present invention is directed to solventless, addition-curable silicone compositions which combine a critical SiH:SiVinyl molar ratio with an adhesion promoter selected from certain silylfumarates, silylmaleates, or silylmaleimide compounds and which cure at relatively low temperatures in a reasonable length of time to form superior adhesives having excellent physical and lap shear adhesive properties and which will adhere to various substrates without the use of a primer.

The use of silylfumarate and silylmaleate compounds as adhesion promoters in silicone compositions is known in the art. Reference is made, for example, to U.S. Pat. Nos. 3,941,741 (De Zuba et al.), which discloses the use of a maleate, fumarate, silylmaleate, or silylfumarate compound as a self-bonding additive in a heat-curable silicone rubber composition. Reference is further made to 4,273,698 (Smith, Jr. et al.); 4,308,372 (Smith, Jr. et al.); and 4,395,507 (Dziark et al.), which disclose the use of a silyl maleate, a silyl fumarate, or a silyl succinate as an adhesion promoter in room temperature curable silicone compositions.

The use of silylfumarate and silylmaleate compounds as adhesion promoters in addition-curable silicone compositions is also known in the art. Reference is made, for example, to U.S. Pat. No. 4,891,407 (Mitchell).

U.S. Pat. No. 4,891,407 to Mitchell is directed to a composition having interpenetrating matrices containing two polymer networks. The first is any polymer that is capable of being stretched, drawn, or expanded so as to obtain a microstructure characterized by nodes interconnected by very small fibrils and is preferably polytetrafluoroethylene. The second polymer network can be an addition curable silicone composition containing an alkenyl-containing polydiorganosiloxane, an organohydrogenpolysiloxane, an organic peroxide or a precious metal-containing catalyst, and, optionally, a reinforcing organopolysiloxane resin, extending and/or reinforcing fillers. The addition-curable composition preferably further contains an adhesion promoter which Mitchell discloses can be any of the maleate and fumarate-functional silanes disclosed in U.S. Pat. No. 3,759,968 to Berger et al., which can be a silylmaleate or silylfumarate, such as bis[3-(trimethoxysilyl)-propyl]-maleate or bis[3-(trimethoxysilyl)propyl]fumarate. The cure temperature disclosed in Mitchell is in the range of 200°-300° C. at a cure time of about 2 hours (see column 6, lines 6-7, and column 8, line 57). It is further disclosed in Mitchell that in a preferred embodiment of the invention thereof, the addition curable silicone composition will contain an inhibitor which will prevent cure below 100° C. (see column 5, lines 55-58).

The present invention is based on the discovery that an addition curable silicone composition containing an adhesion promoter selected from certain silylfumarates, silylmaleates, or silylmaleimide compounds in combination with critical molar ratios of SiH:SiVinyl will cure at lower temperatures, i.e., about 100° C. to about 150° C. in a reasonable period of time, i.e., from about 15 minutes to about 2 hours, to form an adhesive having excellent physical properties and excellent lap shear adhesive properties.

SUMMARY OF THE INVENTION

The present invention provides a solventless, addition-curable silicone composition curable at relatively low temperature to form an adhesive having good physical properties and good adhesive properties, comprising by weight:

(A) 100 parts of a vinyl-containing polydiorganosiloxane composition comprising:

(1) from about 50 to about 100 parts by weight of an essentially cyclic-free vinyl-terminated polydiorganosiloxane having the general formula $$R_2ViSiO(R_2SiO)_m(RViSiO)_nSiR_2Vi \qquad (i)$$

wherein Vi represents a vinyl radical, R is selected from the class consisting of alkyl radicals of 1 to 8 carbon atoms, phenyl radicals, fluoroalkyl radicals of 3 to 10 carbon atoms and mixtures thereof, wherein "m+n" is a number sufficient to provide a viscosity of 100 to about 100,000 centipoise at 25° C., the vinyl content of the polydiorganosiloxane being from about 0.02 to about 2.0 weight %, and (2) from about 0 to about 50 parts by weight of a solid, benzene-soluble vinyl-containing resin copolymer comprising $$R^1{}_3SiO_{\frac{1}{2}} \text{ units and } SiO_{4/2} \text{ units}$$

wherein each $R^1$ is a vinyl radical or a monovalent hydrocarbon radical free of aliphatic unsaturation and containing no more than six carbon atoms, the ratio of $R^1{}_3SiO_{\frac{1}{2}}$ units to $SiO_{4/2}$ units from about 0.5:1 to about 1.5:1, the resin having a vinyl content of from about 1.5 to about 3.5% by weight;

(B) a hydrogen-containing polysiloxane having an average unit formula $$R^2{}_aH_bSiO_{(4-a-b)/2}, \qquad \text{(ii)}$$

wherein $R^2$ is a monovalent hydrocarbon radical or halogenated monovalent hydrocarbon radical having from 1 to about 10 carbon atoms and free of aliphatic unsaturation, "a" is a value of from about 0 to about 3, "b" is a value of from about 0 to about 3, and the sum of "a"+"b" is from 0 to 3, there being at least two silicon-bonded hydrogen atoms per molecule; the polysiloxane being present in an amount sufficient to provide an adhesion-promoting molar ratio of silicon-bonded hydrogen atoms in (B) to olefinically unsaturated radicals in (A);

(C) a catalytic amount of a hydrosilation catalyst;

(D) an effective amount of an adhesion promoter selected from the group consisting of (i) bis[3-(trimethoxysilyl)alkyl]fumarates having the general formula:

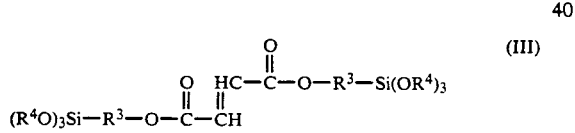

(ii) bis[3-(trimethoxysilyl)alkyl]maleates having the general formula:

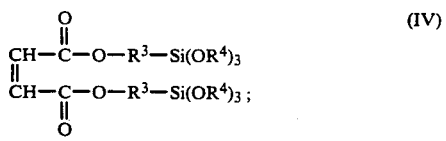

(iii) mixtures of (i) and (ii);

(iv) allyl-[3-(trimethoxysilyl)alkyl]maleates having the general formula

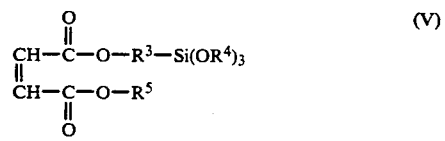

(v) allyl-[3-(trimethoxysilyl)alkyl]fumarates having the general formula

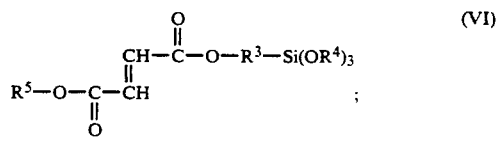

and (vi) N-[3-(trimethoxysilyl)alkyl]maleimides having the general formula

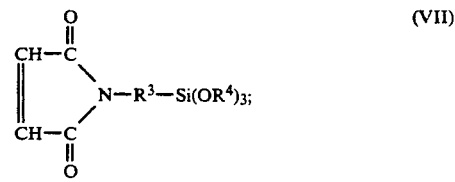

wherein $R^3$, $R^4$, and $R^5$ are each alkyl radicals of 1 to about 8 carbon atoms; and (E) from about 0 to about 200 parts of an extending filler; and (F) from about 0 to about 50 parts of a reinforcing filler; provided that (F) must be present if (A)(2) is absent.

The present invention is further directed to the cured state of the composition described above. The compositions of this invention provide superior adhesives for use in industrial multilayered laminates and as potting compositions or encapsulants.

DETAILED DESCRIPTION OF THE INVENTION

Component (A)(1) of the composition of the present invention is an essentially cyclic-free vinyl-terminated polydiorganosiloxane having the general formula $$R_2ViSiO(R_2SiO)_m(RViSiO)_nSiR_2Vi \qquad \text{(i)}$$

wherein Vi represents a vinyl radical, R is selected from the class consisting of alkyl radicals of 1 to 8 carbon atoms, phenyl radicals, fluoroalkyl radicals of 3 to 10 carbon atoms and mixtures thereof, wherein "m+n" is a number sufficient to provide a viscosity of 100 to about 100,000 centipoise at 25° C., at least 95%, and preferably 100%, of all R radicals being methyl.

The vinyl-terminated polydiorganosiloxane of formula (I) preferably has a viscosity of from about 3000 to about 95,000 centipoise at 25° C. Radicals represented by R are preferably alkyl radicals of 1 to about 4 carbon atoms, and most preferably methyl.

Component (A)(2) is a vinyl-containing benzene-soluble siloxane resin containing $R^1{}_3SiO_{\frac{1}{2}}$ units (M units) and $SiO_{4/2}$ units (Q units), wherein each $R^1$ is a vinyl radical or a monovalent hydrocarbon radical free of aliphatic unsaturation and containing no more than six carbon atoms, the ratio of $R^1{}_3SiO_{\frac{1}{2}}$ units to $SiO_{4/2}$ units from about 0.5:1 to about 1.5:1, the resin having a vinyl content of from about 1.5 to about 3.5% by weight. Component (A)(2) will sometimes be referred to herein as the "vinyl MQ resin".

Component (A)(2) may further contain (i) $R^1SiO_{3/2}$ units, (ii) $R^1{}_2SiO_{\frac{1}{2}}$ units, or both (i) and (ii), the $R^1{}_2SiO_{2/2}$ units being present in an amount equal to from about 0 to about 10 mole percent based on the total number of moles of siloxane units in (A)(2); and the $R^1SiO_{3/2}$ units being present in an amount equal to from about 0 to about 10 mole percent based on the total number of moles of siloxane units in (A)(2).

Component (A) comprises from about 50 to about 100, preferably from about 60 to about 100, and most preferably from about 60 to about 75, parts by weight of (A)(i) and from about 0 to about 50, preferably from about 0 to about 40, and most preferably from about 25 to about 40, parts by weight of (A)(2).

In one preferred embodiment of the composition of the present invention, component (A) comprises from about 60 to about 75 parts by weight of (1) a vinyl terminated polydiorganosiloxane having a viscosity of 65,000 to about 95,000 centipoise at 25° C., and (2) from about 25 to about 40 parts by weight of the vinyl-containing MQ resin.

In another preferred embodiment of the composition of the present invention, component (A) comprises from about 60 to about 75 parts by weight of (1) a vinyl terminated polydiorganosiloxane having a viscosity of 3000 to about 5000 centipoise at 25° C., and (2) from about 25 to about 40 parts by weight of the vinyl-containing MQ resin.

In a preferred embodiment of the composition of the present invention, component (A) comprises 100 parts by weight of:

(1) a blend containing from about 25 to about 35 parts by weight of a vinyl-containing polydiorganosiloxane of formula (I) and having a viscosity of 3000 to about 5000 centipoise at 25° C. and from about 65 to about 75 parts by weight of a vinyl-containing polydiorganosiloxane of formula (I) above and having a viscosity of 75,000 to about 95,000 centipoise at 25° C., the total amount of (1) being 100 parts by weight. Preferably, component (A) will additionally contain (2) from about 5.5 to about 7.5 parts by weight of a low viscosity polydiorganosiloxane composition having an average of at least one vinyldiorganosiloxy endgroup, a vinyl content of from about 0.2 to about 0.3% by weight and a viscosity of from about 400 to about 700 centipoise at 25° C.; (3) from about 5.5 to about 7.5 parts by weight of a low viscosity vinyldiorganoendstopped vinylorganodiorganopolysiloxane having a vinyl content of from about 1.4 to about 2.0% by weight and a viscosity of from about 300 to about 600 centipoise at 25° C.; and (4) 0 parts by weight of the vinyl MQ resin. Preferably, reinforcing filler is present in the composition containing (A)–(E) if (A) contains this vinyl polymer blend.

Component (B) of the composition of the present invention is an organohydrogensiloxane. The organohydrogenpolysiloxane functions as a crosslinking agent and has the average formula:

$$(R^2)_a(H)_bSiO_{(4-a-b)/2} \quad (ii)$$

wherein $R^2$ is a monovalent hydrocarbon radical or halogenated monovalent hydrocarbon radical having from 1 to about 10 carbon atoms and free of aliphatic unsaturation, "a" is a value of from about 0 to about 3, "b" is a value of from about 0 to about 3, and the sum of "a"+"b" is from 0 to 3, there being at least two silicon-bonded hydrogen atoms per molecule.

A preferred organohydrogensiloxane as cross-linking agent in the present invention is that of the formula

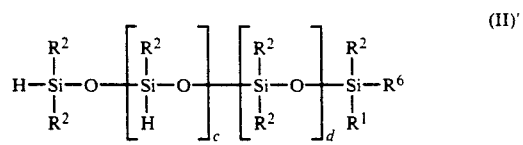

wherein $R^2$ is as defined above, $R^6$ is $R^2$ or hydrogen, "c" and "d" are values such that the sum of "c"+"d" is sufficient to provide a viscosity of from about 10 to about 1000, the organohydrogensiloxane fluid having a hydrogen content of from about 0.02 to about 1.6% by weight.

It should be noted that even though the above compound of formula (II)' is linear, hydride-containing branch-chained polymers can also be used as hydride cross-linking agents in the instant invention. However, a linear polymer such as that of formula (II)', is preferred because it results in a cured elastomer having optimum physical properties.

In formula (II)', $R^2$ is preferably selected from alkyl radicals of 1 to 8 carbon atoms, phenyl, fluoroalkyl radicals of 3 to 10 carbon atoms and hydrogen, the preferred fluoroalkyl radical being trifluoropropyl. Most preferably, $R^2$ represents a methyl radical.

The hydride polysiloxane polymer of formula (II)' has a viscosity of from about 10 to about 1000 and preferably from about 10 to about 150 centipoise at 25° C.

Other hydride cross-linking agents which can be used in the present invention include fluid siloxane copolymer resins comprised of $R^2{}_3SiO_{\frac{1}{2}}$ units ("M"), $SiO_{4/2}$ units ("Q"), and units such as $H(R^2)_2SiO_{\frac{1}{2}}$ units ("$M^H$"), $HR^2SiO_{2/2}$ units ("$D^H$") and $R^2{}_2SiO_{2/2}$ units ("D") and the like, and the mixtures of fluid polyorganosiloxanes and fluid siloxane copolymer resins described in U.S. Pat. No. 3,627,851, which is hereby incorporated by reference herein. The preferred resins are known as $M^HQ$ resins, which comprise diorganohydrogensiloxy units ($M^H$ units) and $SiO_{4/2}$ units (Q units), wherein the ratio of diorganohydrogensiloxy units ($M^H$) units to Q units is from 0.4:1.0 to 2.0:1.0 inclusive. Organohydrogenpolysiloxanes having at least one $R^1$ group, preferably, a methyl group, bonded to the silicon atoms that bear the reactive hydrogen atoms are preferred. It is to be understood that component (B) can be a single compound or a mixture of compounds as long as the average unit formula is as indicated and the indicated compatibility is realized. Hydride resinous siloxanes suitable for use in the present invention are disclosed, for example, in U.S. Pat. No. 4,061,609 to Bobear, which is hereby incorporated by reference herein.

Other hydrogen-containing siloxanes which can be used in this invention are linear triorgano-endstopped organohydrogen-polysiloxane fluids having a viscosity of from about 15 to about 40 centistokes at 25° C. and a hydrogen content of 1.6% by weight. These hydrides generally have the formula $$(R^2)_3SiO(HR^2SiO)_eSi(R^2)_3$$

wherein $R^2$ is as previously defined herein and "e" is a number sufficient to provide a viscosity of from about 15 to about 40 centistokes at 25° C.

It is preferred that the organohydrogensiloxane (B) have a hydride content broadly of 0.05 to 1.6% and more preferably of 0.1 to 1% by weight.

The organohydrogensiloxane (B) must be present in the composition in an amount sufficient to provide an adhesion-promoting molar ratio of silicon-bonded hydrogen atoms in (B) to olefinically unsaturated radicals in (A). This ratio will be dependent on the particular (A) components and (B) components used. In general, the organohydrogensiloxane (B) is present in an amount sufficient to provide a molar ratio of silicon-bonded hydrogen atoms in (B) to olefinic unsaturated radicals in (A) of at least about 1.60:1, preferably from about 1.6 to about 10:1, and most preferably from about 1.6:1 to about 3.5:1. However, if (A) is a vinyl-terminated polydiorganopolysiloxane having a viscosity of 3000 to 5000 centipoise at 25° C. and (B) is a triorganostopped organohydrogensiloxane, the SiH:SiVinyl ratio must be at least 2.1:1, preferably from about 2.1:1 to about 10:1, and most preferably from about 2.1:1 to about 3.5:1.

Component (C) of the composition of the present invention is a catalyst which promotes the hydrosilation reaction. Useful catalysts for facilitating the hydrosilation curing reaction include precious metal catalysts such as those which use ruthenium, rhodium, palladium, osmium, iridium, and platinum, and complexes of these metals. Examples of suitable hydrosilation catalysts for use in the present invention are disclosed, for example, in U.S. Pat. Nos. 3,159,601 and 3,159,662 (Ashby); 3,220,970 (Lamoreaux); 3,814,730 (Karstedt); 3,516,946 (Modic), and 4,029,629 (Jeram); all of the foregoing patents being hereby incorporated by reference herein.

Preferably, the hydrosilation catalyst is a platinum-containing catalyst. One preferred platinum-containing catalyst is a platinum octanol complex containing 90.9 weight % octyl alcohol and 9.1 weight % chloroplatinic acid.

Another preferred platinum-containing catalyst is a platinum complexes formed by reacting chloroplatinic acid containing 4 moles of water of hydration with tetravinylcyclotetrasiloxane in the presence of sodium bicarbonate in an ethanol solution. This catalyst is disclosed in U.S. Pat. No. 3,775,452 to Karstedt, which is hereby incorporated by reference herein.

The catalyst must be used in a catalytic amount, which is that amount sufficient to promote the hydrosilation reaction. Generally, there must be utilized at least 0.1 parts per million of a platinum catalyst in terms of parts of platinum metal.

Component (D) of the composition of the present invention is an adhesion promoter selected from the compounds of Formulas (III)–(VII) presented previously herein. The preferred adhesion promoter for use in this invention is a bis[3-(trimethoxysilyl)alkyl]fumarate having the general formula (III) and particularly bis[3-(trimethoxysilyl)propyl]fumarate.

Preferably, in formulas (III)–(VII), $R^3$, $R^4$, and $R^5$ are each alkyl radicals of 1 to about 4 carbon atoms, and most preferably $R^3$ is propyl and $R^4$ and $R^5$ are each methyl.

The most preferred adhesion promoters are the bis[3-(trialkoxysilyl)alkyl]fumarates, the bis[3-(trialkoxysilyl)alkyl]maleates, or mixtures of the foregoing. Most preferably, the adhesion promoter is bis[3-(trimethoxysilyl)propyl]fumarate or bis[3-(trimethoxysilyl)propyl]maleate.

Compounds of formulas (III)–(VI) and methods for preparing them are disclosed in U.S. Pat. Nos. 3,759,968 (Berger et al.); 3,941,741 (De Zuba et al.); 4,308,372 (Smith, Jr. et al.); and 4,256,870 (Eckberg); all of which are incorporated by reference herein.

The compounds of formulas (III)–(VI) can prepared by reacting compounds of the formulas

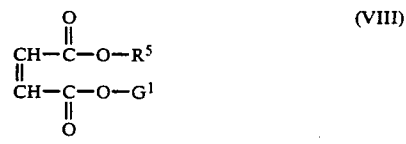

(VIII)

and

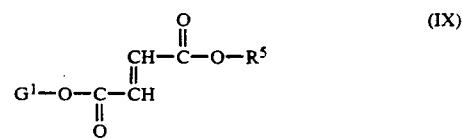

(IX)

wherein $R^5$ is selected from unsaturated monovalent hydrocarbon radicals and unsaturated halogenated monovalent hydrocarbon radicals, and $G^1$ is selected from hydrogen, monovalent hydrocarbon radicals, halogenated monovalent hydrocarbon radicals, unsaturated monovalent hydrocarbon radicals and unsaturated halogenated monovalent hydrocarbon radicals, with a hydrosilane of the formula $$HSiR^7_nX_{3-n} \tag{X}$$

in the presence of a platinum catalyst, wherein $R^7$ is selected from monovalent hydrocarbon radicals and halogenated monovalent hydrocarbon radicals, X is a halogen and preferably chlorine, and "n" is a whole number that varies from 0 to 3. If $G^1$ in formulas (VIII) and (IX) is the same as the $R^5$ radical, that is, it is a monovalent unsaturated hydrocarbon radical, the hydrosilane of formula (X) may be added on to both of the unsaturated linkages in the $R^5$ radicals by reacting two moles of the hydrosilane of formula (X) with one mole of the compounds of formulas (VIII) and (IX). If monosubstitution is desired, on the other hand, one mole of the hydrosilane of formula (X) is reacted with one mole of either the maleates and/or fumarates of formulas (VIII) and (IX) and a mono-addition product will be obtained.

The reaction is preferably carried out at room temperature and a solvent is not required. In that case, any inert solvent such as toluene, xylene, mineral spirits, benzene, and the like can be used. Suitable catalysts for the addition of the silane of formula (X) to the compounds of formulas (VIII) and (X) are the various platinum and platinum compound catalysts known in the art. These catalysts include elemental platinum in the finely divided state which can be deposited on charcoal or aluminum, as well as the various platinum compounds such as chloroplatinic acid, a platinum hydrocarbon complex of the type shown in U.S. Pat. Nos. 3,159,601; 3,159,602; as well as the platinum alcoholic complexes prepared from the chloroplatinic acids which are described in U.S. Pat. No. 3,220,972 (Lamoreaux).

To replace the chlorine atoms, the halosilyl ester or imide may be reacted with an alcohol or an acid of the formula $R^8OH$, $R^8COOH$, wherein $R^8$ is selected from monovalent hydrocarbon radicals and halogenated monovalent hydrocarbon radicals and is preferably a saturated monovalent hydrocarbon, such as alkyl, with no more than 8 carbon atoms. In preparing the reaction mixture, one mole of the halosilylmaleate is reacted with an excess of the alcohol or acid such that the number of moles of alcohol or acid exceeds the number of moles of the halogen attached to the silicon atom, and the reaction is allowed to proceed at reduced pressures and moderate temperatures when it is carried out in the absence of a solvent. The reduced pressures and moderate temperatures are preferred so that the acid that is formed from the alkoxylation or acylation would be boiled off and will not contaminate the desired product. Thus, it is preferred that the reaction be carried out at less than 100 mm of mercury pressure at temperatures in the range of 75° C. to 100° C.

As an alternative, the alkoxylation or acylation reaction may be carried out in the presence of a hydrocarbon solvent, in which solvent the hydrogen chloride that was released is not soluble so that during the course of the reaction, the acid which is given off does not affect the silylmaleate or silylfumarate product which is within the scope of formulas (VIII) and (IX). As an alternative, both the maleates and fumarates of formulas (VIII) and (IX) may be reacted with a hydroalkoxysilane in place of the hydrohalosilane of formula (X). However, with the alkoxysilane, the SiH-olefin addition in the presence of a platinum catalyst proceeds more slowly than in the case where the silane of formula (X) is used.

The adhesion promoter of formula (VII) can be prepared by mixing 0.125 moles of methyltrimethoxysilane and 0.095 moles of maleic anhydride with slight heating, followed by the dropwise addition of 0.095 moles of aminopropyltrimethoxysilane with stirring.

The adhesion promoter (D) is present in the composition of this invention in an effective amount which is that amount sufficient to improve the adhesion of the composition. Typically, the adhesion promoter (D) is present in an amount ranging from about 0.5 to about 2.0 percent by weight, and preferably from about 0.75 to about 1.25 percent by weight.

The composition of the present invention may also contain any of the conventional (E) extending and/or (F) reinforcing fillers. The composition contains from about 0 to about 200 and preferably from about 10 to about 100 parts by weight of (E) an extending filler; and from about 0 to about 50, and preferably from about 20 to about 50 parts by weight of (F) a reinforcing filler.

Examples of extending fillers (E) useful herein include alpha quartz, crushed quartz, aluminum oxide, aluminum silicate, zirconium silicate, magnesium oxide, zinc oxide, talc, diatomaceous earth, iron oxide, calcium carbonate, clay, titania, zirconia, mica, glass, such as ground glass or glass fiber, sand, carbon black, graphite, barium sulfate, zinc sulfate, wood flour, cork, fluorocarbon polymer powder and the like. The preferred extending filler for use in the present invention is alpha-quartz.

Examples of reinforcing fillers (F) include silica, such as fumed silica and precipitated silica; and treated silica fillers such as fumed or precipitated silica that has been reacted with, e.g., an organohalosilane, a disiloxane, or a disilazane. Fumed silica is particularly effective as a reinforcing filler for the silicone component of the present invention. A particularly preferred treated fumed silica is one wherein a fumed silica has been treated first with cyclic polysiloxanes, e.g., dimethylcyclic tetramer, according to the methods known in the art, for example, as taught in U.S. Pat. No. 2,938,009 (Lucas), which is incorporated by reference herein, and then treated with a silazane, e.g., hexamethyldisilazane, for example, as taught in U.S. Pat. Nos. 3,635,743 (Smith) and 3,847,848 (Beers), which are both incorporated by reference herein, so as to remove most of the free silanols on the surface of the tetramertreated silica. Such a filler is sometimes referred to herein as "treated fumed silica".

The composition of the present invention can be prepared by homogeneously mixing Components (A)-(F) and any optional ingredients, using suitable mixing means, such as a spatula, a drum roller, a mechanical stirrer, a three-roll mill, a sigma blade mixer, a bread dough mixer, and a two-roll mill.

The order of mixing Components (A)-(F) is not critical; however, it is preferred that Components (B) and (C) be brought together in the presence of Component (D), most preferably in a final mixing step. Thus, it is possible to mix all components in one mixing step immediately prior to the intended use of the curable composition. Alternatively, certain components can be premixed to form two or more packages which can be stored, if desired, and then mixed in a final step immediately prior to the intended use thereof.

It is preferred to mix Components (C), (D), and a portion of Component (A), along with certain optional components such as fillers and solvents, to provide a first package and Component (B), along with the remaining portion of Component (A), if any, to provide a second package. These two packages can then be stored until the composition of this invention is desired and then homogeneously mixed.

Curing of the curable composition is typically carried out at a temperature of about 100° C. and higher, and preferably from about 100° to about 150° C. Cure time generally varies from about 15 minutes to about 2 hours.

The addition-curable composition of this invention will directly self-bond in the absence of primer to various plastic, metal, glass, and masonry substrates. Examples of plastic substrates to which the composition will bond include plastic substrates selected from polyphenylene/styrene blends, polyacrylamides, polystyrenes, conditioned polycarbonates, polyesters, polyimides, polybutylene terephthalates, fluoropolymers and non-resin containing polyetherimides. Examples of metal substrates include metal substrates selected from copper, alclad aluminum, anodized aluminum, galvanized steel, cold-rolled steel, cast aluminum, and cast magnesium. The term "conditioned" with regard to polycarbonate means that the mosiure in the polycarbonate substrate must have been reduced to a point where water released during adhesive cure does not interfere with bonding at the interface. Conditioning is typically accomplished by drying the polycarbonate substrate at about 120° C. for about 12-24 hours.

The thickness of the adhesive composition on a substrate is typically from about 20 to about 60 mils.

The composition of this invention is applied to the surface of the substrate by any suitable means such as rolling, spreading, spraying, and the like, and cured as described above. After application of the adhesive composition onto the substrate, the composition is cured at the cure temperature and cure time described previously herein.

In order that those skilled in the art may better understand the present invention, the following examples are given to illustrate but not to limit the invention which is fully delineated by the appended claims. All parts in the examples are by weight.

EXPERIMENTAL

Glossary

The following terms used in the examples and tables below are hereinbelow defined:

The following terms used in the examples and tables below are hereinbelow defined:

(1) LV Polymer-I-a low viscosity vinyldimethyl-endstopped polydimethysiloxane having a viscosity of approximately 3300–3900 centistokes at 25° C.

(2) Catalyst-a plantinum octanol complex containing 90.9 weight % octyl alcohol and 9.1 weight % chloroplatinic acid.

(3) Treated Fumed Silica-I-a fumed silica filler (surface area 200 m²/g) which has been treated first with octamethylcyclotetrasiloxane and then with hexamethyldisilazane in a manner as described previously herein.

(4) BTMSPF-Bis(3-trimethoxysilylpropyl)fumarate.

(5) Hydride Resin-a hydride siloxane resin containing $(CH_3)_2HSiO_{\frac{1}{2}}$ units and $SiO_{4/2}$ units, the resin hydride having a hydrogen content of about 0.8 to 1.2 weight %.

(6) Crosslinker-a dimethylhydrogen siloxane crosslinking agent having a hydrogen content of approximately 0.43 to 0.46 weight % and containing (a) 100 parts of Low Viscosity Polymer-I and (b) 100 parts of Hydride Resin.

(7) HV Polymer-I-a vinyl-endstopped dimethylpolysiloxane having a viscosity of approximately 75,000–95,000 centipoise at 25° C.

(8) HV Polymer/Resin Blend-a blend having a viscosity of 60,000–75,000 centipoise at 25° C. and containing (i) 75 parts of HV Polymer-I and (ii) 25 parts of a vinyl silicone resin containing $MQD^1$ units, wherein M represents $(CH_3)_3SiO_{\frac{1}{2}}$ units, Q represents $SiO_{4/2}$ units, and $D^1$ represents $(CH_3)(Vi)SiO_{2/2}$ units, the resin having a vinyl content of approximately 1.5% to about 3.5% by weight.

(9) Inhibitor-3,5-dimethyl-hexyn-3-ol.

(10) Hydride Fluid-a linear hydride fluid having a viscosity of from about 50 to 150 centistokes at 25° C. and a hydride content of 0.18–0.28% by weight.

(11) Methyl-stopped Hydride Fluid-a trimethylstopped linear polymethylhydrogensiloxane fluid having a viscosity of about 15–40 centistokes at 25° C. and a hydride content of approximately 1.6%.

(12) Vinyl Blend-I-a blend containing (a) 70 parts by weight of HV Polymer-I at a viscosity of about 80,000 centipoise at 25° C. and (b) 30 parts by weight of LV Polymer-I at a viscosity of about 4000 centipoise at 25° C., the blend having a viscosity of from about 35,000 to about 45,000 centipoise at 25° C.

(13) LV Polymer-II-a low viscosity polydiorganosiloxane composition having an average of at least one vinyldiorganosiloxy endgroup, a vinyl content of from about 0.2 to about 0.3% by weight and a viscosity of from about 400 to about 700 centipoise at 25° C.;

(14) LV Polymer-III-a low' viscosity vinyldiorganoendstopped vinylorganodiorganopolysiloxane having a vinyl content of from 1.4 to about 2.0% by weight and a viscosity of from about 300 to about 600 centipoise at 25° C.;

(15) LV Polymer/Resin Blend-a blend having a viscosity of 3000–5000 centipoise at 25° C. and containing (i) 75 parts of LV Polymer-I and (ii) 25 parts of a vinyl silicone resin containing $MQD^1$ units, wherein M represents $(CH_3)_3SiO_{\frac{1}{2}}$ units, Q represents $SiO_{4/2}$ units, and $D^1$ represents $(CH_3)(Vi)SiO_{2/2}$ units, the resin having a vinyl content of approximately 1.5% to about 3.5% by weight.

(16) Vinyl Blend II-a blend containing (a) 64.1 parts by weight of Vinyl Blend-I; (b) 27.7 parts by weight of Treated Fumed Silica-I; (c) 4.1 parts by weight of LV Vinyl Polymer-II; and (d) 4.1 parts by weight of LV Vinyl Polymer-III.

(17) psi-pounds per square inch.

(18) $H/C_2H_3$-ratio of SiH:SiVinyl groups.

(19) 150° C./1 hour, 100° C./2 hours, and 100° C./18 hours-the cure temperature and the length of time in which the sample in question was exposed to the cure temperature.

EXAMPLES 1–4

Four compositions having the formulations shown in Table 1 below were prepared. The shore A, tensile, elongation, lap shear of samples cured at 100° C. for 2 hours and of samples cured at 150° C. for 1 hour are shown in Table 1 below. The substrate was Alclad Aluminum.

TABLE 1

Examples 1–4: Formulations and Properties

| Ingredient | 1 | 2 | 3 | 4 |
|---|---|---|---|---|
| HV-Polymer/Resin Blend | 100 | 100 | 100 | 100 |
| alpha-quartz | 47.2 | 47.2 | 47.2 | 47.2 |
| CaCO₃ | 3 | 3 | 3 | 3 |
| BTMSPF | 1.6 | 1.6 | 1.6 | 1.6 |
| Catalyst | 0.048 | 0.048 | 0.048 | 0.048 |
| Inhibitor | 0.0024 | 0.0024 | 0.0024 | 0.0024 |
| Hydride Fluid | 5.6 | 4.3 | 2.9 | 2 |
| H/C₂H₃ | 2.09 | 1.61 | 1.08 | 0.75 |
| Shore A | 60 | 53 | 40 | 28 |
| Tensile | 850 | 792 | 663 | 455 |
| Elongation | 255 | 283 | 378 | 380 |
| Lap Shear 100° C. (% Cohesive Failure) | 720 (100) | 612 (95) | 270 (0) | 245 (20) |
| Lap Shear 150° C. (% Cohesive Failure) | 776 (100) | 737 (100) | 607 (100) | 467 (100) |

COMPARISON EXAMPLES A–D

Four compositions having the formulations shown in Table 2 below were prepared. The shore A, tensile, elongation, lap shear of samples cured at 100° C. for 2 hours and of samples cured at 150° C. for 1 hour are shown in Table 2 below. The substrate was Alclad Aluminum.

TABLE 2

Comparison Examples A–D: Formulations and Properties

| Ingredient | A | B | C | D |
|---|---|---|---|---|
| HV-Polymer/Resin Blend | 100 | 100 | 100 | 100 |
| alpha-quartz | 47.2 | 47.2 | 47.2 | 47.2 |
| CaCO₃ | 3 | 3 | 3 | 3 |
| Catalyst | 0.048 | 0.048 | 0.048 | 0.048 |
| Inhibitor | 0.0024 | 0.0024 | 0.0024 | 0.0024 |
| Hydride Fluid | 5.6 | 4.3 | 2.9 | 2 |
| H/C₂H₃ | 2.09 | 1.61 | 1.08 | 0.75 |
| Shore A | 64 | 60 | 55 | 36 |
| Tensile | 920 | 895 | 760 | 620 |
| Elongation | 220 | 240 | 240 | 365 |
| Lap Shear 100° C. (% Cohesive | 615 (65) | 510 (50) | 185 (0) | 115 (20) |

TABLE 2-continued

Comparison Examples A–D: Formulations and Properties

| Ingredient | Example No. | | | |
|---|---|---|---|---|
| | A | B | C | D |
| Failure) | | | | |
| Lap Shear 150° C. (% Cohesive Failure) | 800 (100) | 700 (100) | 325 (10) | 405 (35) |

EXAMPLES 5–8

Four compositions having the formulations shown in Table 3 below were prepared. The shore A, tensile, elongation, lap shear of samples cured at 100° C. for 2 hours and of samples cured at 150° C. for 1 hour are shown in Table 3. The substrate was Alclad Aluminum.

TABLE 3

Examples 5–8: Formulations and Properties

| Ingredient | Example No. | | | |
|---|---|---|---|---|
| | 5 | 6 | 7 | 8 |
| LV-Polymer/Resin Blend | 100 | 100 | 100 | 100 |
| alpha-quartz | 47.2 | 47.2 | 47.2 | 47.2 |
| CaCO$_3$ | 3 | 3 | 3 | 3 |
| BTMSPF | 1.6 | 1.6 | 1.6 | 1.6 |
| Catalyst | 0.048 | 0.048 | 0.048 | 0.048 |
| Inhibitor | 0.0024 | 0.0024 | 0.0024 | 0.0024 |
| Hydride Fluid | 6.5 | 5 | 3.4 | 2.3 |
| H/C$_2$H$_3$ | 2.11 | 1.62 | 1.10 | 0.75 |
| Shore A | 63 | 56 | 45 | 27 |
| Tensile | 1050 | 985 | 657 | 353 |
| Elongation | 102 | 101 | 165 | 207 |
| Lap Shear 100° C. (% Cohesive Failure) | 830 (100) | 655 (85) | 122 (0) | 84 (0) |
| Lap Shear 150° C. (% Cohesive Failure) | 785 (100) | 620 (100) | 532 (75) | 193 (25) |

EXAMPLES 9–12

Four compositions having the formulations shown in Table 4 below were prepared. The shore A, tensile, elongation, lap shear of samples cured at 100° C. for 2 hours and of samples cured at 150° C. for 1 hour are shown in Table 4. The substrate was Alclad Aluminum.

TABLE 4

Examples 9–12: Formulations and Properties

| Ingredient | Example No. | | | |
|---|---|---|---|---|
| | 9 | 10 | 11 | 12 |
| LV-Polymer/Resin Blend | 100 | 100 | 100 | 100 |
| Treated Fumed Silica-1 | 20 | 20 | 20 | 20 |
| BTMSPF | 1 | 1 | 1 | 1 |
| Catalyst | 0.036 | 0.036 | 0.036 | 0.036 |
| Hydride Fluid | 6.5 | 5 | 3.4 | 2.3 |
| H/C$_2$H$_3$ | 2.11 | 1.62 | 1.10 | 0.75 |
| Shore A | 64 | 57 | 47 | 31 |
| Tensile | 960 | 920 | 775 | 415 |
| Elongation | 140 | 155 | 260 | 290 |
| Lap Shear 100° C. (% Cohesive Failure) | 625 (100) | 465 (100) | 80 (0) | 70 (0) |
| Lap Shear 150° C. | 670 (100) | 715 (100) | 405 (75) | 150 (0) |

TABLE 4-continued

Examples 9–12: Formulations and Properties

| Ingredient | Example No. | | | |
|---|---|---|---|---|
| | 9 | 10 | 11 | 12 |
| (% Cohesive Failure) | | | | |

COMPARISON EXAMPLES E–H

Four compositions having the formulations shown in Table 5 below were prepared. These compositions were identical to those prepared in Examples 9–12 except that BTMSPF was not present in these compositions. The shore A, tensile, elongation, lap shear of samples cured at 100° C. for 2 hours and of samples cured at 150° C. for 1 hour are shown in Table 5 below. The substrate was Alclad Aluminum.

TABLE 5

Comparison Examples E–H: Formulations and Properties

| Ingredient | Example No. | | | |
|---|---|---|---|---|
| | E | F | G | H |
| LV-Polymer/Resin Blend | 100 | 100 | 100 | 100 |
| Treated Fumed Silica-1 | 20 | 20 | 20 | 20 |
| Catalyst | 0.036 | 0.036 | 0.036 | 0.036 |
| Hydride Fluid | 6.5 | 5 | 3.4 | 2.3 |
| H/C$_2$H$_3$ | 2.11 | 1.62 | 1.10 | 0.75 |
| Shore A | 60 | 58 | 52 | 37 |
| Tensile | 1005 | 1045 | 845 | 890 |
| Elongation | 160 | 180 | 190 | 370 |
| Lap Shear 100° C. (% Cohesive Failure) | 625 (100) | 580 (100) | 595 (100) | 250 (100) |
| Lap Shear 150° C. (% Cohesive Failure) | 705 (100) | 835 (100) | 705 (100) | 460 (100) |

It is not understood why the absence of adhesion promoter in the compositions prepared in Comparison Examples E–H did not deleteriously affect the physical or lap shear adhesion properties of the compositions. The compositions prepared in all of the other examples presented herein clearly required the presence of the adhesion promoter to have good physical and lap shear adhesive properties.

EXAMPLES 13–16

Four compositions having the formulations shown in Table 6 below were prepared. The shore A, tensile, elongation, lap shear of samples cured at 100° C. for 2 hours and of samples cured at 150° C. for 1 hour are shown in Table 6. The substrate was Alclad Aluminum.

TABLE 6

Examples 13–16: Formulations and Properties

| Ingredient | Example No. | | | |
|---|---|---|---|---|
| | 13 | 14 | 15 | 16 |
| LV Polymer-I | 100 | 100 | 100 | 100 |
| alpha-quartz | 47.2 | 47.2 | 47.2 | 47.2 |
| CaCO$_3$ | 3 | 3 | 3 | 3 |
| BTMSPF | 1.6 | 1.6 | 1.6 | 1.6 |
| Catalyst | 0.048 | 0.048 | 0.048 | 0.048 |
| Inhibitor | 0.0024 | 0.0024 | 0.0024 | 0.0024 |
| Hydride Fluid | 1.45 | 1.1 | 0.75 | 0.53 |
| H/C$_2$H$_3$ | 2.07 | 1.57 | 1.07 | 0.76 |
| Shore A | 22 | Too Soft | Too Soft | Too Soft |
| Tensile | 185 | — | — | — |

TABLE 6-continued

Examples 13-16: Formulations and Properties

| Ingredient | Example No. 13 | 14 | 15 | 16 |
|---|---|---|---|---|
| Elongation | 185 | — | — | — |
| Lap Shear 100° C. (% Cohesive Failure) | 135 (100) | 75 (100) | 35 (100) | Fell Apart |
| Lap Shear 150° C. (% Cohesive Failure) | 185 (100) | 135 (100) | 45 (100) | Fell Apart |

EXAMPLES 17-20

Four compositions having the formulations shown in Table 7 below were prepared. The shore A, tensile, elongation, lap shear of samples cured at 100° C. for 2 hours and of samples cured at 150° C. for 1 hour are shown in Table 7. The substrate was Alclad Aluminum.

TABLE 7

Examples 17-20: Formulations and Properties

| Ingredient | Example No. 17 | 18 | 19 | 20 |
|---|---|---|---|---|
| HV-Polymer/Resin Blend | 100 | 100 | 100 | 100 |
| alpha-quartz | 47.2 | 47.2 | 47.2 | 47.2 |
| CaCO₃ | 3 | 3 | 3 | 3 |
| BTMSPF | 1.6 | 1.6 | 1.6 | 1.6 |
| Catalyst | 0.048 | 0.048 | 0.048 | 0.048 |
| Inhibitor | 0.0024 | 0.0024 | 0.0024 | 0.0024 |
| Hydride Resin | 6.4 | 5.6 | 4.3 | 2.9 |
| H/C₂H₃ | 2.39 | 2.09 | 1.61 | 1.08 |
| Shore A | 59 | 61 | 60 | 42 |
| Tensile | 850 | 865 | 840 | 656 |
| Elongation | 255 | 240 | 260 | 330 |
| Lap Shear 100° C. (% Cohesive Failure) | 615 (100) | 700 (100) | 445 (50) | 260 (0) |
| Lap Shear 150° C. (% Cohesive Failure) | 840 (100) | 805 (100) | 785 (100) | 590 (65) |

COMPARATIVE EXAMPLES I-L

Four compositions having the formulations shown in Table 8 below were prepared. These compositions are identical to those prepared in Examples 17-20 above except that the compositions of Comparative Examples I-L do not contain BTMSPF. The shore A, tensile, elongation, lap shear of samples cured at 100° C. for 2 hours and of samples cured at 150° C. for 1 hour are shown in Table 8. The substrate was Alclad Aluminum.

TABLE 8

Comparative Examples I-L: Formulations and Properties

| Ingredient | Example No. I | J | K | L |
|---|---|---|---|---|
| HV Polymer/Resin Blend | 100 | 100 | 100 | 100 |
| alpha-quartz | 47.2 | 47.2 | 47.2 | 47.2 |
| CaCO₃ | 3 | 3 | 3 | 3 |
| Catalyst | 0.048 | 0.048 | 0.048 | 0.048 |
| Inhibitor | 0.0024 | 0.0024 | 0.0024 | 0.0024 |
| Hydride Resin | 6.5 | 5.6 | 4.3 | 2.9 |
| H/C₂H₃ | 2.39 | 2.09 | 1.61 | 1.08 |
| Shore A | 64 | 65 | 67 | 50 |
| Tensile | 840 | 850 | 895 | 745 |
| Elongation | 225 | 265 | 240 | 290 |
| Lap Shear 100° C. | 95 (0) | 95 (0) | 70 (0) | Fell Apart |
| Lap Shear 150° C. | 180 (0) | 205 (0) | 240 (0) | 175 (0) |

EXAMPLES 21-24

Four compositions having the formulations shown in Table 9 below were prepared. The shore A, tensile, elongation, lap shear of samples cured at 100° C. for 2 hours and of samples cured at 150° C. for 1 hour are shown in Table 9. The substrate was Alclad Aluminum.

TABLE 9

Examples 21-24: Formulations and Properties

| Ingredient | Example No. 21 | 22 | 23 | 24 |
|---|---|---|---|---|
| LV Polymer/Resin Blend | 100 | 100 | 100 | 100 |
| alpha-quartz | 47.2 | 47.2 | 47.2 | 47.2 |
| CaCO₃ | 3 | 3 | 3 | 3 |
| BTMSPF | 1.6 | 1.6 | 1.6 | 1.6 |
| Catalyst | 0.048 | 0.048 | 0.048 | 0.048 |
| Inhibitor | 0.0024 | 0.0024 | 0.0024 | 0.0024 |
| Hydride Resin | 7.4 | 6.5 | 5 | 3.4 |
| H/C₂H₃ | 2.40 | 2.11 | 1.62 | 1.10 |
| Shore A | 55 | 60 | 61 | 49 |
| Tensile | 850 | 970 | 1025 | 810 |
| Elongation | 120 | 125 | 118 | 165 |
| Lap Shear 100° C. (% Cohesive Failure) | 660 (100) | 680 (100) | 565 (60) | 231 (0) |
| Lap Shear 150° C. (% Cohesive Failure) | 885 (100) | 915 (100) | 705 (100) | 650 (65) |

EXAMPLES 25-28

Four compositions having the formulations shown in Table 10 below were prepared. The shore A, tensile, elongation, lap shear of samples cured at 100° C. for 2 hours and of samples cured at 150° C. for 1 hour are shown in Table 11. The substrate was Alclad Aluminum.

TABLE 10

Examples 25-28: Formulations and Properties

| Ingredient | Example No. 25 | 26 | 27 | 28 |
|---|---|---|---|---|
| LV-Polymer/Resin Blend | 100 | 100 | 100 | 100 |
| Treated Fumed Silica-I | 20 | 20 | 20 | 20 |
| BTMSPF | 1 | 1 | 1 | 1 |
| Catalyst | 0.036 | 0.036 | 0.036 | 0.036 |
| Hydride Resin | 7.4 | 6.5 | 5 | 3.4 |
| H/C₂H₃ | 2.40 | 2.11 | 1.62 | 1.10 |
| Shore A | 55 | 60 | 60 | 50 |
| Tensile | 830 | 830 | 960 | 740 |
| Elongation | 210 | 175 | 180 | 225 |
| Lap Shear 100° C. (% Cohesive Failure) | 620 (100) | 565 (100) | 470 (65) | 150 (0) |
| Lap Shear | 645 (100) | 770 (100) | 705 (100) | 630 (65) |

TABLE 10-continued

Examples 25-28: Formulations and Properties

| Ingredient | Example No. | | | |
|---|---|---|---|---|
| | 25 | 26 | 27 | 28 |
| 150° C. (% Cohesive Failure) | | | | |

COMPARISON EXAMPLES M-P

Four compositions having the formulations shown in Table 11 below were prepared. These compositions were identical to those prepared in Examples 25-28 except that BTMSPF was not present in the compositions of Comparative Examples M-P. The shore A, tensile, elongation, lap shear of samples cured at 100° C. for 2 hours and of samples cured at 150° C. for 1 hour are shown in Table 11. The substrate was Alclad Aluminum.

TABLE 11

Comparison Examples M-P: Formulations and Properties

| Ingredient | Example No. | | | |
|---|---|---|---|---|
| | M | N | O | P |
| LV-Polymer/Resin Blend | 100 | 100 | 100 | 100 |
| Treated Fumed Silica-I | 20 | 20 | 20 | 20 |
| Catalyst | 0.036 | 0.036 | 0.036 | 0.036 |
| Hydride Resin | 7.4 | 6.5 | 5 | 3.4 |
| H/C$_2$H$_3$ | 2.40 | 2.11 | 1.62 | 1.10 |
| Shore A | 51 | 55 | 60 | 53 |
| Tensile | 895 | 925 | 1060 | 980 |
| Elongation | 270 | 215 | 195 | 210 |
| Lap Shear 100° C. (% Cohesive Failure) | 30 (0) | 30 (0) | 40 (0) | 30 (0) |
| Lap Shear 150° C. (% Cohesive Failure) | 80 (0) | 120 (0) | 140 (0) | 105 (0) |

EXAMPLES 29-32

Four compositions having the formulations shown in Table 12 below were prepared. The shore A, tensile, elongation, lap shear of samples cured at 100° C. for 2 hours and of samples cured at 150° C. for 1 hour are shown in Table 12. The substrate was Alclad Aluminum.

TABLE 12

Examples 29-32: Formulations and Properties

| Ingredient | Example No. | | | |
|---|---|---|---|---|
| | 29 | 30 | 31 | 32 |
| HV-Polymer/Resin Blend | 100 | 100 | 100 | 100 |
| alpha-quartz | 47.2 | 47.2 | 47.2 | 47.2 |
| CaCO$_3$ | 3 | 3 | 3 | 3 |
| BTMSPF | 1.6 | 1.6 | 1.6 | 1.6 |
| Catalyst | 0.048 | 0.048 | 0.048 | 0.048 |
| Inhibitor | 0.0024 | 0.0024 | 0.0024 | 0.0024 |
| Methyl-stopped Hydride Fluid | 3.2 | 2.4 | 1.7 | 1.1 |
| H/C$_2$H$_3$ | 2.13 | 1.60 | 1.13 | 0.73 |
| Shore A | 56 | 48 | 35 | 28 |
| Tensile | 765 | 724 | 621 | 465 |
| Elongation | 279 | 317 | 398 | 398 |
| Lap Shear 100° C. (% Cohesive Failure) | 560 (100) | 480 (100) | 435 (100) | 280 (100) |

TABLE 12-continued

Examples 29-32: Formulations and Properties

| Ingredient | Example No. | | | |
|---|---|---|---|---|
| | 29 | 30 | 31 | 32 |
| Lap Shear 150° C. (% Cohesive Failure) | 660 (100) | 550 (100) | 460 (100) | 390 (100) |

EXAMPLES 33-36

Four compositions having the formulations shown in Table 13 below were prepared. The shore A, tensile, elongation, lap shear of samples cured at 100° C. for 2 hours and of samples cured at 150° C. for 1 hour are shown in Table 14 below.

TABLE 13

Examples 33-36: Formulations

| Ingredient | Example No. | | | |
|---|---|---|---|---|
| | 33 | 34 | 35 | 36 |
| LV-Polymer/Resin Blend | 100 | 100 | 100 | 100 |
| alpha-quartz | 47.2 | 47.2 | 47.2 | 47.2 |
| CaCO$_3$ | 3 | 3 | 3 | 3 |
| BTMSPF | 1.6 | 1.6 | 1.6 | 1.6 |
| Catalyst | 0.048 | 0.048 | 0.048 | 0.048 |
| Inhibitor | 0.0024 | 0.0024 | 0.0024 | 0.0024 |
| Methyl-stopped Hydride Fluid | 3.6 | 2.8 | 1.9 | 1.3 |
| H/C$_2$H$_3$ | 2.07 | 1.61 | 1.09 | 0.75 |
| Shore A | 62 | 58 | 43 | 33 |
| Tensile | 1037 | 942 | 521 | 263 |
| Elongation | 123 | 135 | 140 | 140 |
| Lap Shear 100° C. (% Cohesive Failure) | 780 (100) | 465 (100) | 430 (100) | 260 (100) |
| Lap Shear 150° C. (% Cohesive Failure) | 765 (100) | 730 (100) | 695 (100) | 325 (100) |

EXAMPLES 37-40

Four compositions having the formulations shown in Table 14 below were prepared. The shore A, tensile, elongation, lap shear of samples cured at 100° C. for 2 hours and of samples cured at 150° C. for 1 hour are shown in Table 14. The substrate was Alclad Aluminum.

TABLE 14

Examples 37-40: Formulations and Properties

| Ingredient | Example No. | | | |
|---|---|---|---|---|
| | 37 | 38 | 39 | 40 |
| LV polymer-I | 100 | 100 | 100 | 100 |
| alpha-quartz | 47.2 | 47.2 | 47.2 | 47.2 |
| CaCO$_3$ | 3 | 3 | 3 | 3 |
| BTMSPF | 1.6 | 1.6 | 1.6 | 1.6 |
| Catalyst | 0.048 | 0.048 | 0.048 | 0.048 |
| Inhibitor | 0.0024 | 0.0024 | 0.0024 | 0.0024 |
| Methyl-stopped Hydride Fluid | 0.82 | 0.63 | 0.43 | 0.29 |
| H/C$_2$H$_3$ | 2.08 | 1.60 | 1.09 | 0.74 |
| Shore A | 29 | Too Soft | Too Soft | Too Soft |
| Tensile | 210 | — | — | — |
| Elongation | 150 | — | — | — |
| Lap Shear 100° C. (% Cohesive Failure) | 145 (100) | 60 (100) | 30 (100) | Fell Apart |
| Lap Shear 150° C. | 245 (100) | 85 (100) | 25 (100) | Fell Apart |

TABLE 14-continued

Examples 37–40: Formulations and Properties

| Ingredient | Example No. | | | |
|---|---|---|---|---|
| | 37 | 38 | 39 | 40 |
| (% Cohesive Failure) | | | | |

EXAMPLES 41–44

Four compositions having the formulations shown in Table 15 below were prepared. The shore A, tensile, elongation, lap shear of samples cured at 100° C. for 2 hours and of samples cured at 150° C. for 1 hour are shown in Table 15. The substrate was Alclad Aluminum.

TABLE 15

Examples 41–44: Formulations and Properties

| Ingredient | Example No. | | | |
|---|---|---|---|---|
| | 41 | 42 | 43 | 44 |
| LV polymer-I | 100 | 100 | 100 | 100 |
| Treated Fumed Silica-1 | 20 | 20 | 20 | 20 |
| BTMSPF | 1 | 1 | 1 | 1 |
| Catalyst | 0.036 | 0.036 | 0.036 | 0.036 |
| Hydride Fluid | 0.82 | 0.63 | 0.43 | 0.29 |
| H/C$_2$H$_3$ | 2.07 | 1.57 | 1.07 | 0.76 |
| Shore A | 29 | Too Soft | Too Soft | Too Soft |
| Tensile | 370 | 350 | — | — |
| Elongation | 340 | 370 | — | — |
| Lap Shear 100° C. (% Cohesive Failure) | 320 (100) | 240 (100) | 105 (100) | Fell Apart |
| Lap Shear 150° C. (% Cohesive Failure) | 235 (100) | 185 (100) | 85 (100) | Fell Apart |

EXAMPLE 45

Example 45 illustrates the use of allyl-3-trimethoxysilylpropylmaleate as an adhesion promoter in the composition of this invention.

To a beaker was weighed 10 grams of LV-Polymer/Resin Blend, 10 ppm of catalyst, 0.3 grams of allyl-3-trimethoxysilylpropylmaleate, and 1.0 gram of Crosslinker. The ingredients were mixed throughly. The mixture remained clear but contained a slight haze when compared directly to a mixture identical except for the allyl-3-trimethoxysilylpropylmaleate. The mixture was placed in an aluminum cup and cured at 150° C. for 10 minutes. After curing and cooling, the cured composition adhered tenaciously to the aluminum cup. The sample showed cohesive failure.

COMPARISON EXAMPLE Q

A composition identical to that prepared in Example 45 was prepared except that it did not contain allyl-3-trimethoxysilylpropylmaleate. The composition prepared in Comparison Example Q was cured and cooled in the same manner described in Example 45. The cured composition did not adhere to the cup. This composition showed adhesive failure.

EXAMPLE 46

Example 46 illustrates the use of N-(3-trimethoxysilylpropyl)maleimide as an adhesion promoter in a composition within the scope of the present invention. A composition was prepared containing 100 parts by weight of LV Vinyl Polymer-1, 17 parts by weight of treated fumed silica, 10 ppm of catalyst, and 9 parts by weight of Crosslinker. The composition was prepared by mixing the filler and the vinyl base polymer in a double planetary mixer and heating the mixture to a temperature of 130° C.–135° C. for 2 hours at 30 in Hg. The resulting mixture was cooled under vacuum, blended with the catalyst, and then blended with Crosslinker.

The composition was then applied to the surface of an alclad aluminum substrate which had been cleaned with isopropanol and the resulting laminate was placed in a 200° C. oven for 10 minutes. The bond thickness, lap shear value, and % cohesive failure were measured and were 21 mils, 570 psi, and 100%.

EXAMPLE 47

A composition was prepared having the formulation:

TABLE 16

Example 47: Formulation

| Ingredient | Amount (Parts by Weight) |
|---|---|
| Vinyl Blend II | 221.0 |
| BTMSPF | 2.2 |
| Inhibitor | 0.11 |
| Hydride Fluid | 3.1 |
| Catalyst | 0.006 |

The composition having the formulation above was prepared by blending the ingredients and heating the resulting mixture under vacuum for 3 hours at 150° C.

Two lap shear samples of the composition above were prepared by applying the composition to an alclad aluminum substrate and to a VALOX ® panel substrate (VALOX ® is a trademark registered to General Electric Company and represents a polybutylene terephthalate available from General Electric Company) and curing the substrate/composition structure at 150° C. for 1 hour. The results are presented in Table 17 below.

TABLE 17

Example 47: Lap Shear Data

| Substrate | Tensile (psi) | % Cohesive Failure |
|---|---|---|
| Alclad Aluminum | 390 | 100 |
| Alclad Aluminum | 438 | 100 |
| Alclad Aluminum | 444 | 100 |
| VALOX ® Panel | 382 | 100 |
| VALOX ® Panel | 378 | 95 |
| VALOX ® Panel | 450 | 90 |

COMPARISON EXAMPLE S

Example 47 was repeated except that BTMSPF was omitted from the composition. Thus, the composition prepared in Comparative Example S had the following formulation:

TABLE 18

Comparative Example S: Formulation

| Ingredient | Amount (Parts by Weight) |
|---|---|
| Vinyl Blend II | 221.0 |
| Inhibitor | 0.11 |
| Hydride Fluid | 3.1 |
| Catalyst | 0.006 |

Two lap shear samples of the composition above were prepared by applying the composition to an alclad aluminum substrate and to a VALOX ® panel substrate and curing the substrate/composition structure at 150° C. for 1 hour. The results are presented in Table 22 below.

TABLE 19

Comparison Example R: Lap Shear Data

| Substrate | Tensile (psi) | % Cohesive Failure |
|---|---|---|
| Alclad Aluminum | 234 | 0 |
| Alclad Aluminum | 196 | 0 |
| Alclad Aluminum | 229 | 0 |
| VALOX ® Panel | 317 | 10 |
| VALOX ® Panel | 226 | 10 |
| VALOX ® Panel | 222 | 0 |

The data presented in Table 19 shows that the composition without BTMSPF does not have good adhesion to alclad aluminum or VALOX ® panel substrates.

What is claimed is:

1. A solventless, addition-curable silicone composition curable at relatively low temperature to form an adhesive having good physical properties and good adhesive properties, comprising by weight:
   (A) 100 parts of a vinyl-containing polydiorganosiloxane composition comprising:
      (1) from about 60 to about 75 parts by weight of an essentially cyclic-free vinyl-terminated polydiorganosiloxane having the general formula:

$$R_2ViSiO(R_2SiO)_m(RViSiO)_nSiR_2Vi \quad (i)$$

wherein Vi represents a vinyl radical, R is selected from the class consisting of alkyl radicals of 1 to 8 carbon atoms, phenyl radicals, fluoroalkyl radicals of 3 to 10 carbon atoms and mixtures thereof, wherein "m+n" is a number sufficient to provide a viscosity of 65,000 to about 95,000 centipoise at 25° C., the vinyl content of the polydiorganosiloxane being from about 0.02 to about 2.0 weight %, and
      (2) from about 25 to about 40 parts by weight of a solid, benzene-soluble vinyl-containing resin copolymer comprising $$R^1{}_3SiO_{\frac{1}{2}} \text{ units and } SiO_{4/2} \text{ units} \quad (i)$$

wherein each $R^1$ is a vinyl radical or a monovalent hydrocarbon radical free of aliphatic unsaturation and containing no more than six carbon atoms, the ratio of $R^1{}_3SiO_{\frac{1}{2}}$ units to $SiO_{4/2}$ units from about 0.5:1 to about 1.5:1, the resin having a vinyl content of from about 1.5 to about 3.5% by weight;
   (B) a hydrogen-containing polysiloxane having an average unit formula $$R^2{}_aH_bSiO_{(4-a-b)/2}, \quad (ii)$$

wherein $R^2$ is a monovalent hydrocarbon radical or halogenated monovalent hydrocarbon radical having from 1 to about 10 carbon atoms and free of aliphatic unsaturation, "a" is a value of from about 0 to about 3, "b" is a value of from about 0 to about 3, and the sum of "a"+"b" is from 0 to 3, there being at least two silicon-bonded hydrogen atoms per molecule; the polysiloxane being present in an amount sufficient to provide an adhesion-promoting molar ratio of silicon-bonded hydrogen atoms in (B) to olefinically unsaturated radicals in (A);
   (C) a catalytic amount of a hydrosilation catalyst;
   (D) an effective amount of an adhesion promoter selected from the group consisting of
      (i) bis[3-(trimethoxysilyl)alkyl]fumarates having the general formula:

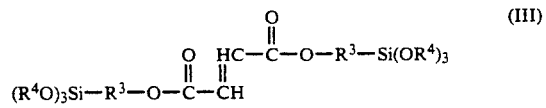

(ii) bis[3-(trimethoxysilyl)alkyl]maleates having the general formula:

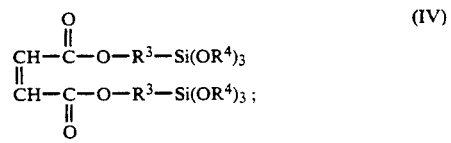

(iii) mixtures of (i) and (ii);
      (iv) allyl-[3-(trimethoxysilyl)alkyl]maleates having the general formula:

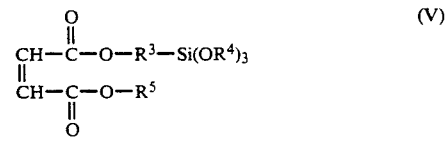

(v) allyl-[3-(trimethoxysilyl)alkyl]fumarates having the general formula

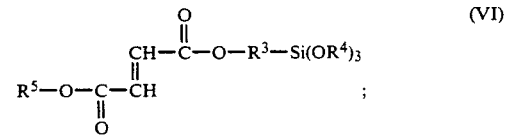

and
      (vi) N-[3-(trimethoxysilyl)alkyl]maleimides having the general formula

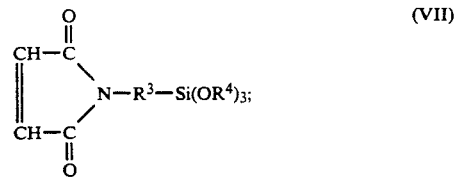

wherein $R^3$, $R^4$, and $R^5$ are each alkyl radicals of 1 to about 8 carbon atoms; and
   (E) from about 0 to about 200 parts of an extending filler; and
   (F) from about 0 to about 50 parts of a reinforcing filler; provided that (F) must be present if (A)(2) is absent.

2. A composition according to claim 1 wherein $R^3$, $R^4$, and $R^5$ are each alkyl radicals of 1 to about 4 carbon atoms.

3. A composition according to claim 2 wherein $R^3$ is propyl and $R^4$ and $R^5$ are each methyl radicals.

4. A composition according to claim 1 wherein the hydrogen-containing polydiorganosiloxane (B) is present in an amount sufficient to provide a molar ratio of silicon-bonded hydrogen atoms in (B) to olefinic unsaturated radicals in (A) of at least about 1.60:1.

5. A composition according to claim 4 wherein the hydrogen-containing polydiorganosiloxane (B) is present in an amount sufficient to provide a molar ratio of silicon-bonded hydrogen atoms in (B) to olefinic unsaturated radicals in (A) of from about 1.6:1 to about 10:1.

6. A composition according to claim 5 wherein the hydrogen-containing polydiorganosiloxane (B) is present in an amount sufficient to provide a molar ratio of silicon-bonded hydrogen atoms in (B) to olefinic unsaturated radicals in (A) of from about 1.6:1 to about 3.5:1.

7. A composition according to claim 1 wherein the adhesion promoter is present in an amount ranging from about 0.5 to about 2.0 percent by weight.

8. A composition according to claim 7 wherein the adhesion promoter is present in an amount ranging from about 0.75 to about 1.25 percent by weight.

9. A composition according to claim 1 wherein $R^3$ is propyl.

10. A composition according to claim 1 wherein $R^4$ and $R^5$ are each methyl.

11. A composition according to claim 1 wherein the adhesion promoter is a bis[3-(trimethoxysilyl)alkyl]-fumarate having the general formula:

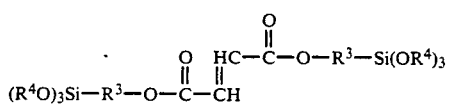

wherein $R^3$ and $R^4$ are each alkyl radicals having from 1 to about 8 carbon atoms.

12. A composition according to claim 1 wherein $R^3$ and $R^4$ are each alkyl radicals having from 1 to about 4 carbon atoms.

13. A composition according to claim 1 wherein the adhesion promoter is a bis[3-(trimethoxysilyl)propyl]-fumarate.

14. A composition according to claim 1 wherein the adhesion promoter is a bis[3-(trialkoxysilyl)alkyl]maleate having the general formula:

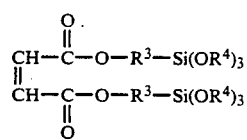

wherein $R^3$ and $R^4$ are each alkyl radicals having from 1 to about 8 carbon atoms.

15. A composition according to claim 14 wherein $R^3$ and $R^4$ are each alkyl radicals having from 1 to about 4 carbon atoms.

16. A composition according to claim 15 wherein the adhesion promoter is a bis[3-(trimethoxysilyl)propyl]-maleate.

17. A composition according to claim 1 wherein (A)(2) comprises (i) $R^1_2SiO_{2/2}$ units, (ii) $R^1SiO_{3/2}$ units, or both (i) and (ii), the $R^1_2SiO_{2/2}$ units being present in an amount equal to from about 0 to about 10 mole percent based on the total number of moles of siloxane units in (A)(2); and the $R^1SiO_{3/2}$ units being present in an amount equal to from about 0 to about 10 mole percent based on the total number of moles of siloxane units in (A)(2).

18. A composition according to claim 1 wherein (E) is present in an amount ranging from about 25 to about 75 parts by weight.

19. A composition according to claim 1 wherein the extending filler is alpha-quartz.

20. A composition according to claim 1 wherein (F) is present in an amount ranging from about 20 to about 50 parts by weight.

21. A composition according to claim 15 wherein the reinforcing filler is treated fumed silica.

22. A composition according to claim 1 wherein the hydrosilation catalyst is a platinum-containing hydrosilation catalyst.

23. A composition according to claim 22 wherein the platinum-containing hydrosilation catalyst is selected from the group consisting of (i) a platinum catalyst solution comprising about 90.9% by weight of octyl alcohol and 9.1% by weight of chloroplatinic acid and (ii) a platinum complex formed by reacting chloroplatinic acid with tetravinylcyclotetrasiloxane in the presence of sodium bicarbonate in an ethanol solution.

24. The cured composition of claim 1.

25. A solventless, addition-curable silicone composition curable at relatively low temperature to form an adhesive having good physical properties and good adhesive properties, comprising by weight:
(A) 100 parts of a vinyl-containing polydimethylsiloxane composition comprising from about 60 to about 75 parts by weight of a linear vinyl-terminated polydimethylsiloxane having a viscosity of from about 3000 to about 5000 centipoise at 25° C., the vinyl content of the polydiorganosiloxane being from about 0.02 to about 2.0 weight %; and (2) from about 25 to about 40 parts by weight of the solid, benzene-soluble vinyl-containing resin copolymer comprising $(CH_3)_3SiO_{\frac{1}{2}}$ units and $SiO_{4/2}$ units, the ratio of $(CH_3)_3SiO_{\frac{1}{2}}$ units to $SiO_{4/2}$ units from about 0.5:1 to about 1.5:1, the resin having a vinyl content of from about 1.5 to about 3.5% by weight;
(B) a hydrogen-siloxane copolymer resin comprising $SiO_{4/2}$ units and $R^2_2HSiO_{\frac{1}{2}}$ units; the ratio of $R^2_2HSiO_{\frac{1}{2}}$ units to $SiO_{4/2}$ units being from about 1 to about 2, the hydrogensiloxane copolymer resin having a hydrogen content of from about 0.8 to about 1.2% by weight and wherein $R^2$ is a monovalent hydrocarbon radical or a halogenated monovalent hydrocarbon radical having from 1 to about 10 carbon atoms and free of aliphatic unsaturation;
(C) a catalytic amount of a platinum-containing hydrosilation catalyst is selected from the group consisting of (i) a platinum catalyst solution comprising about 90.9% by weight of octyl alcohol and 9.1% by weight of chloroplatinic acid and (ii) a platinum complex formed by reacting chloroplatinic acid with tetravinylcyclotetrasiloxane in the presence of sodium bicarbonate in an ethanol solution;
(D) from about 0.75 to about 1.25% by weight of an adhesion promoter selected from the group consisting of (i) bis[3-(trimethoxysilyl)propyl]fumarates, (ii) bis[3-(trimethoxysilyl)propyl]maleates; and (iii) mixtures of (i) and (ii);
(E) 0 parts of alpha-quartz; and
(F) from about 20 to about 50 parts of a treated fumed silica filler.

26. The cured composition of claim 25.

27. A solventless, addition-curable silicone composition curable at relatively low temperature to form an adhesive having good physical properties and good adhesive properties, comprising by weight:
(A) 100 parts by weight of a blend containing
(1) a blend containing from about 25 to about 35 parts by weight of a vinyl-containing polydiorganosiloxane of formula (1) and having a viscosity of 3000 to about 5000 centipoise at 25° C. and from about 65 to about 75 parts by weight of a vinyl-containing polydiorganosiloxane of formula (1) above and having a viscosity of 75,000 to about 95,000 centipoise at 25° C. the total amount of being 100 parts by weight;
(2) from about 5.5 to about 7.5 parts by weight of a low viscosity polydiorganosiloxane composition having an average of at least one vinyldiorganosiloxy endgroup, a vinyl content of from about 0.2 to about 0.3% by weight and a viscosity of from about 400 to about 700 centipoise at 25° C.;
(3) from about 5.5 to about 7.5 parts by weight of a low viscosity vinyldiorgano-endstopped vinylorganodiorganopolysiloxane having a vinyl content of from about 1.4 to about 2.0% by weight and a viscosity of from about 300 to about 600 centipoise at 25° C.; and
(B) a hydrogen-siloxane copolymer resin comprising $SiO_{4/2}$ units and $R^2_2HSiO_{\frac{1}{2}}$ units; the ratio of $R^2_2HSiO_{\frac{1}{2}}$ units to $SiO_{4/2}$ being from about 1 to about 2, the hydrogensiloxane copolymer resin having a hydrogen content of from about 0.8 to about 1.2% by weight and wherein $R^2$ is a monovalent hydrocarbon radical or a halogenated monovalent hydrocarbon radical having from 1 to about 10 carbon atoms and free of aliphatic unsaturation;
(C) a catalytic amount of a platinum-containing hydrosilation catalyst is selected from the group consisting of (i) a platinum catalyst solution comprising about 90.9% by weight of octyl alcohol and 9.1% by weight of chloroplatinic acid and (ii) a platinum complex formed by reacting chloroplatinic acid with tetravinylcyclotetrasiloxane in the presence of sodium bicarbonate in an ethanol solution;
(D) group consisting of (i) bis[3-(trimethoxysilyl)propyl]fumarates, (ii) bis[3-(trimethoxysilyl)propyl]maleates; and (iii) mixtures of (i) and (ii);
(E) 0 parts of alpha-quartz; and
(F) from about 20 to about 50 parts of a treated fumed silica filler.

28. A composition according to claim 27 wherein 0 parts by weight of alpha-quartz (E) is present.

29. A composition according to claim 1 wherein the hydrogen-containing polydiorganosiloxane (B) is an organohydrogensiloxane selected from the group consisting essentially of (1) organohydrogensiloxane fluids having a viscosity of from about 10 to about 1000 centipoise at 25° C. and the general formula:

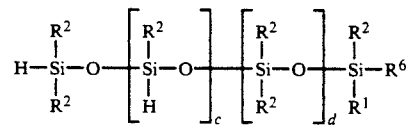

wherein $R^2$ is a monovalent hydrocarbon radical or halogenated monovalent hydrocarbon radical having from 1 to about 10 carbon atoms and free of aliphatic unsaturation, $R^6$ is $R^2$ or hydrogen, "c" and "d" are values such that the sum of "c"+"d" is sufficient to provide a viscosity of from about 10 to about 1000, the organohydrogensiloxane fluid having a hydrogen content of from about 0.15 to about 1.6% by weight; (2) a hydrogen-siloxane copolymer resin comprising $SiO_{4/2}$ units and $R^2_2HSiO_{\frac{1}{2}}$ units; the ratio of $R^2_2HSiO_{\frac{1}{2}}$ units to $SiO_{4/2}$ units being from about 1 to about 2, the hydrogensiloxane copolymer resin having a hydrogen content of from about 0.8 to about 1.2% by weight; and (3) linear triorgano-endstopped organohydrogenpolysiloxane fluids having the formula $(R^2)_3SiO(HR^2SiO)_eSi(R^2)_3$, wherein "e" is a number sufficient to provide a viscosity of from about 10 to about 40 centistokes at 25° C. and a hydrogen content of about 1.6% by weight.

* * * * *